Figure 1:
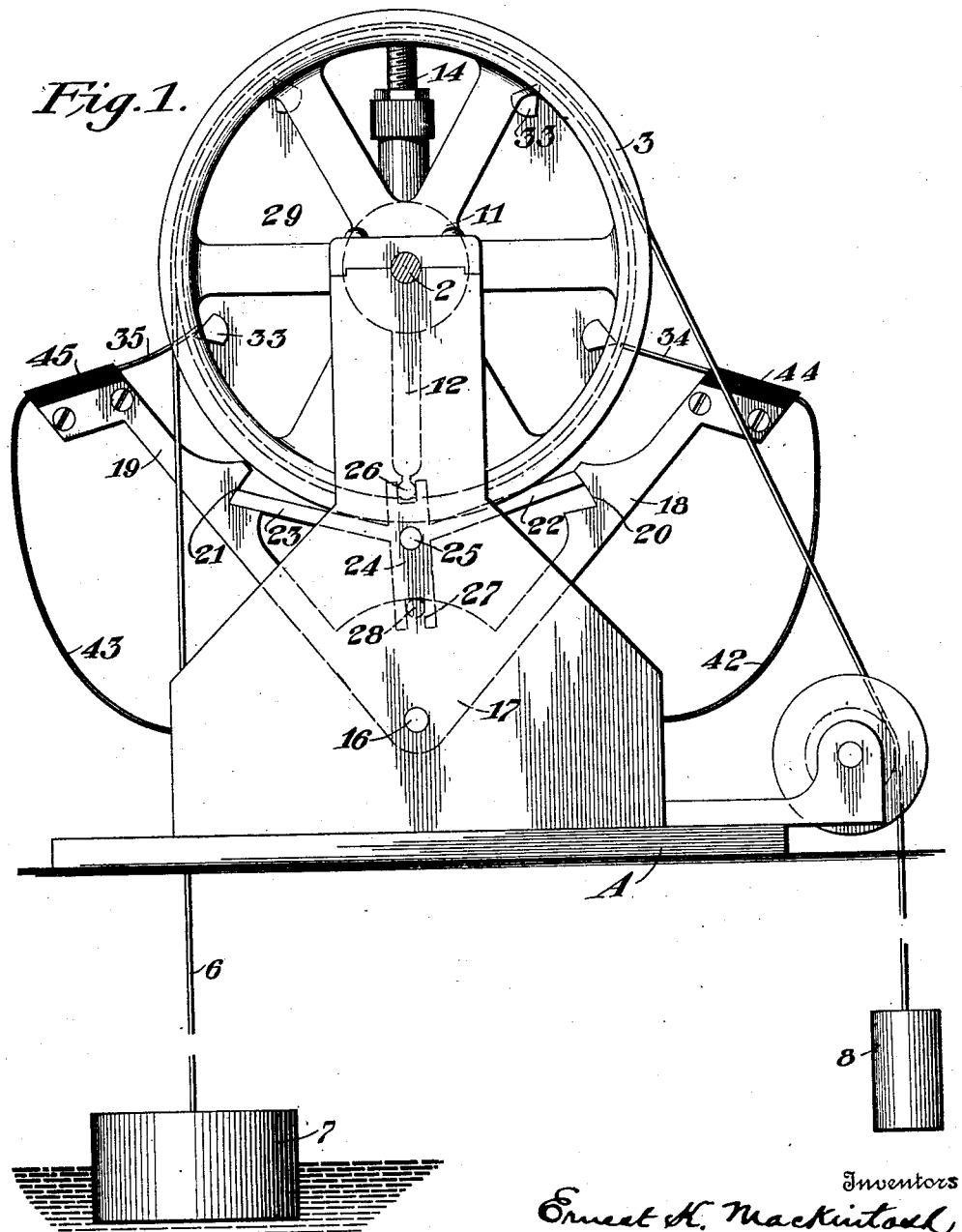

E. K. MACKINTOSH & E. A. SMITH.
ELECTRIC SWITCH.
APPLICATION FILED DEC. 16, 1909.

973,362.

Patented Oct. 18, 1910.
3 SHEETS—SHEET 1.

E. K. MACKINTOSH & E. A. SMITH.
ELECTRIC SWITCH.
APPLICATION FILED DEC. 16, 1909.
973,362.
Patented Oct. 18, 1910.
3 SHEETS—SHEET 2.
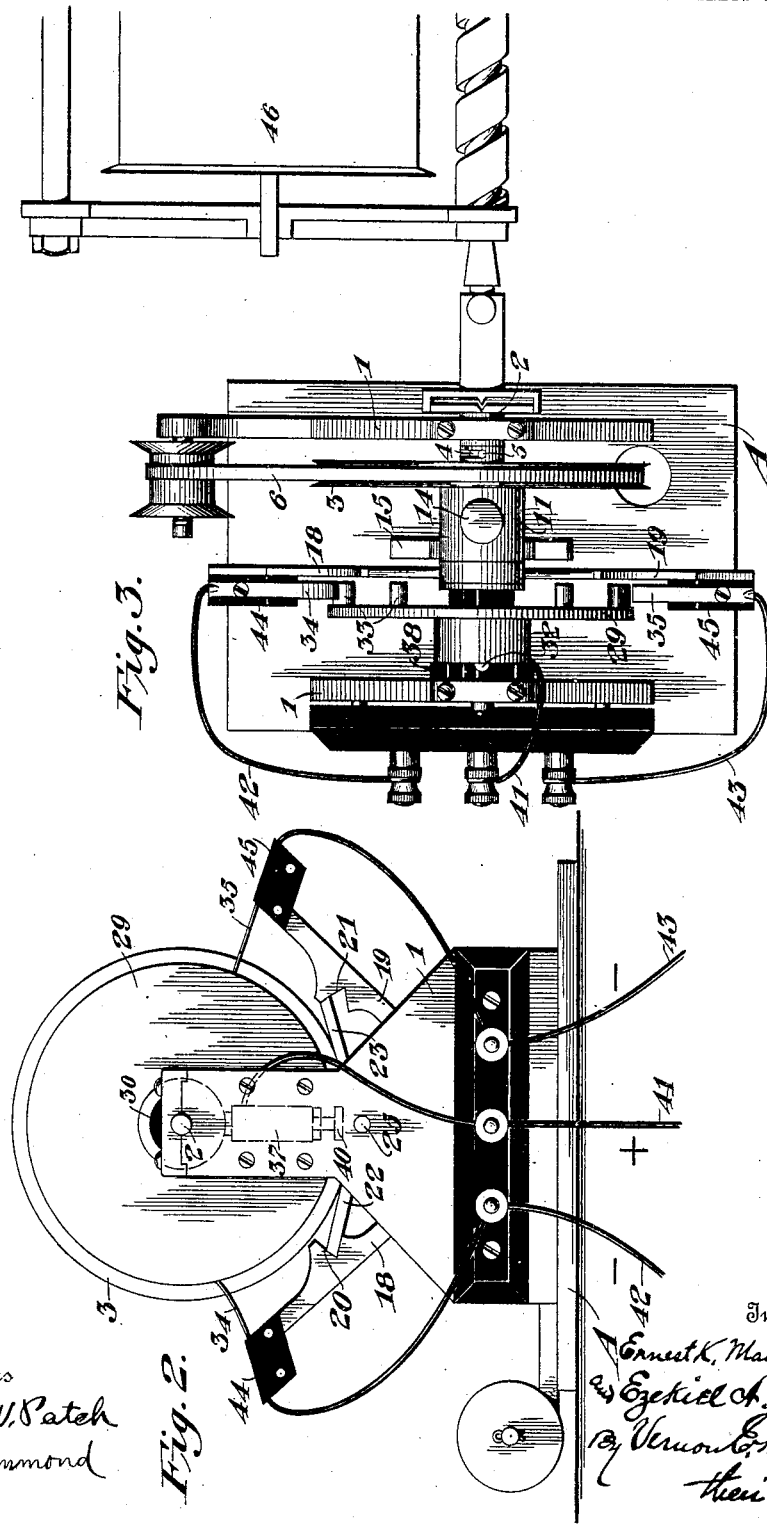

E. K. MACKINTOSH & E. A. SMITH.
ELECTRIC SWITCH.
APPLICATION FILED DEC. 16, 1909.
973,362.
Patented Oct. 18, 1910.
3 SHEETS—SHEET 3.
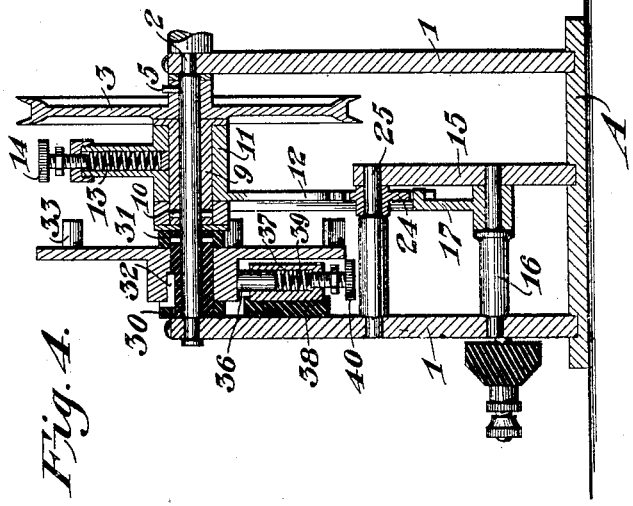
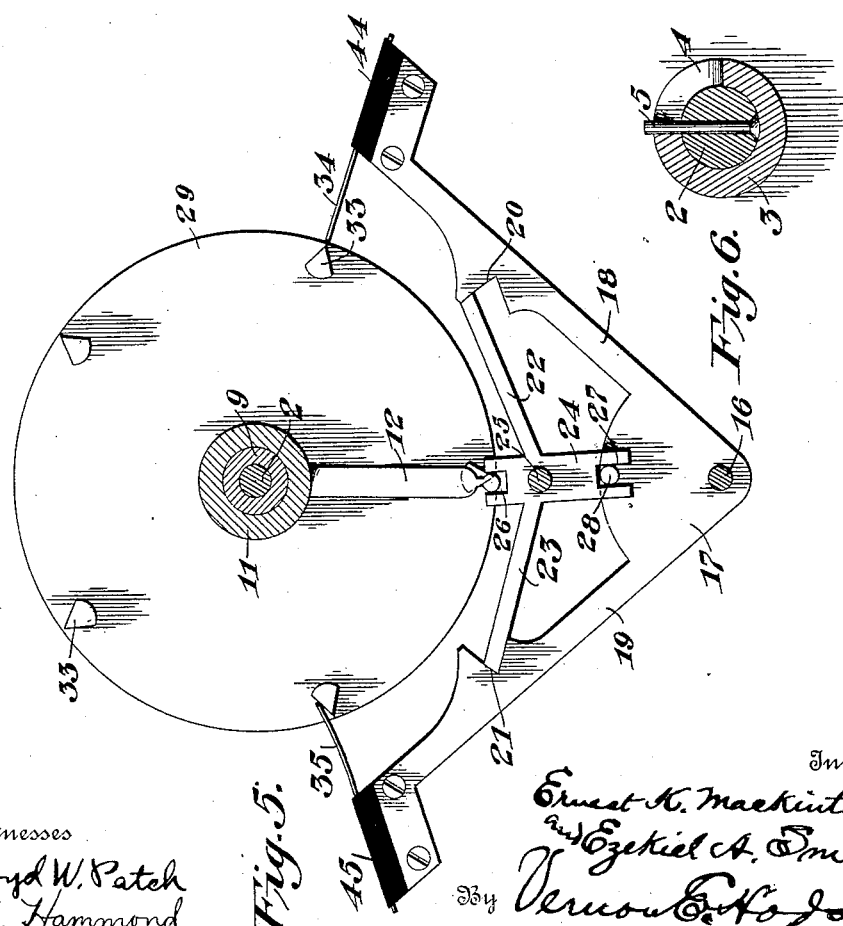

UNITED STATES PATENT OFFICE.

ERNEST K. MACKINTOSH AND EZEKIEL A. SMITH, OF WASHINGTON, DISTRICT OF COLUMBIA.

ELECTRIC SWITCH.

973,362.   Specification of Letters Patent.   Patented Oct. 18, 1910.

Application filed December 16, 1909.  Serial No. 533,317.

*To all whom it may concern:*

Be it known that we, ERNEST K. MACKINTOSH and EZEKIEL A. SMITH, citizens of the United States, residing at Washington, District of Columbia, have invented certain new and useful Improvements in Electric Switches, of which the following is a specification.

Our invention relates to an improvement in electric switches.

The object of the invention is to provide means whereby the switch will cause the completion of electrical circuits as a result of the movement of a body, which movement is to be indicated or recorded by means of the resultant electrical impulses. In this instance it is connected to a float which will cause the switch to be moved either for a forward or a reverse action, it depending upon the movement of the float. If the water or liquid should be rising, the float would rise, causing the switch to make contact whereby an electrical circuit would be completed for indicating at some convenient point that the water or liquid was rising, or by succeeding contacts caused by the increasing height of the liquid to continuously indicate the level attained. But if the water should recede, then the switch would be caused to make a reverse movement, and an electrical circuit would be formed through a different conductor for indicating that the liquid was receding, and, as in rising, to constantly indicate its level.

The invention consists in certain novel features of construction and combinations of parts which will be hereinafter described and pointed out in the claims.

In the accompanying drawings:—Figure 1 is an enlarged view in elevation of one end; Fig. 2 is an end view; Fig. 3 is a top plan; Fig. 4 is a vertical sectional view; Fig. 5 is a view in elevation of the disk and switch; and Fig. 6 is a detail view of the shaft and hub of the float pulley.

A represents the base, upon which are mounted two standards 1, 1, and upon which is journaled the shaft 2. Loosely mounted upon the shaft is a pulley wheel 3, which is provided with a slot 4 in the hub thereof. A pin 5 passes through the shaft 2 and projects into the slot 4. A belt 6 passes over the pulley wheel 3, and connected to one end of the belt is a float 7, and connected to the other end is a counterweight 8. The object of the slotted hub of the pulley wheel is to retard the reversal of the switch until the desired change of level for reversal is completed, thus making allowance for the wave action which tends to cause the float to move up and down, causing the pulley wheel to be rotated forward and back, making frequent and unnecessary reversals. The slot also allows for free movement of pulley wheel and belt equal to distance between contact points on wheel 29. It is desired that the rotation of the shaft 2 will be caused only when there is an actual receding and rising of the water, therefore the slot 4 in the hub of the pulley wheel 3 will allow for the wave action, but when there is an actual rising or receding of the water, the hub will move so that the pin 5 will be engaged at one end of the slot 4, thereby causing the shaft to be rotated as the wheel 3 is moved by the receding or rising of the water.

A sleeve 9 is keyed to the shaft 2 by means of a pin 10, one end of the sleeve passing against the hub of the wheel 3 for holding the same in proper position. Mounted upon the sleeve is a hub 11, to which is connected an arm 12. The hub is held in engagement with the sleeve 9 by the frictional engagement of a coil spring 13, the tension of which is regulated by a thumb screw 14. An upright is mounted upon the base A, and mounted upon the upright 15 and one of the standards 1 is a shaft 16, upon which is journaled a switch 17 which is composed of two arms 18 and 19. The arms 18 and 19 are provided with notches 20 and 21 along their inner surfaces, in which are received lugs 22 and 23 which are connected to a plate 24 which is pivotally mounted upon a shaft 25, which is supported by the upright 15 and one of the standards 1. The plate 24 is provided with slots 26 and 27. Received in the slot 26 is the arm 12 of the hub 11, and received in the slot 27 is a pin 28 which is mounted upon the switch 17. When the pulley wheel 3 is caused to be moved, transmitting motion to the shaft 2, a frictional engagement between the hub 11 and the sleeve 9 will cause the hub to move the same direction as the rotation of the shaft 2 and wheel 3. Assuming that it is moving clockwise, as indicated in Fig. 5 of the drawings, the plate 24 will be caused to move counter-clockwise at point 26, causing the lug 23 to be forced into the notch 21 and the plate 24 to act upon the pin 28 to cause the switch arm 19 to be moved inward, or in an opposite direction to the movement of the arm 12, therefore the arm 18 would be moved outward and the lug 22 moved upward. The lug 23 limits the inward movement of the switch arm 19.

The contact disk or wheel 29 is mounted upon the shaft 2, but is insulated therefrom by insulation 30. The insulation being keyed to the shaft 2 by pin 31 and the wheel 29 being keyed to the insulation 30 by a key 32. Contact points 33, 33, are wedge-shaped pins formed upon the wheel 29 which are adapted to be engaged by the spring contact brushes 34 and 35 of the switch arms 18 and 19, respectively, said brushes being insulated from the switch arms 18 and 19 by suitable insulations 44 and 45, respectively. A pin 36 engages the hub of the wheel 29 and is mounted in a box or cylinder 37 which is supported upon one of the standards 1 but insulated therefrom by insulation 38. The pin 36 is held frictionally against the hub of the wheel 29 by a coil spring 39, and the tension of the spring 39 is regulated by a thumb screw 40. The pin 36 acts as a brush for transmitting electric current to the wheel 29, and as a brake for limiting the rotary movement of the disk or wheel 29 from any other cause during reversal or wave action of pulley wheel except the actual rising or falling of the water or liquid. A wire 41 is connected to the brush 36, and wires 42 and 43 connect the contact brushes 34 and 35 of the switch arms 18 and 19, whereby the current will be transmitted through the wires 41 and 43 when the contact brush 35 is in engagement with one of the contact points 33 on the wheel 29. However, when the contact brush 34 is in contact with the contact point of the wheel 29, the current will be transmitted through the wires 41 and 42. The current can be transmitted to any suitable indicating mechanism desired for indicating the rising and falling of the water.

In Fig. 3 we have shown a recorder 46 connected to the shaft 2 which may be used in connection with the invention. In fact, any type of recorder might be applied to the machine.

To briefly outline the operation of the device, the pulley wheel 3 is caused to be moved as the float 7 rises or falls. The rotation of the pulley wheel causes the shaft 2 to be rotated whereby motion is transmitted to the disk or wheel 29 and to the hub 11, which has frictional engagement with the shaft 2. The hub 11 is provided with an arm 12, which is adapted to engage a pivotally mounted plate 24, which plate is connected to switch 17 for causing the switch arms 18 and 19 to be actuated. Assuming that the water is rising, the wheel 29 will be moving clock-wise (Fig. 1), and the arm 12 will move in the same direction. This movement of the arm 12 will cause the plate 24 to be moved so that the lug 23 will enter the notch 21 of the arm 19 as it moves inwardly toward the wheel 29 causing the contact brush 35 to be forced inward, whereby it will come into contact with the contact points 33 as the wheel 29 revolves. The lug 23 entering the notch 21 of the arm 19 limits the inward movement of the switch arm 19. The inward movement of the switch arm 19 toward the disk or wheel 29 causes the arm 18 to move outwardly or away from the wheel 29, thereby preventing the contact brush 34 from coming into engagement with the contact points 33, and lug 22, through its engagement with the upper point of notch 20, assists in preventing the outward movement of switch arm 19, due to pressure of brush 35 on contact point 33. Assuming that the contact brush 35 is in contact with one of the contact points 33 on the wheel 29, as indicated in Fig. 5, the current will be transmitted through the wires 41 and 43 to the indicating apparatus (not shown). If, however, the water should recede, the pulley 3, shaft 2, hub 11, and wheel 29 would all be caused to move in an opposite direction. The arm 12 in this case would cause the upper end of the plate 24 to move to the right, causing the switch arm 18 to be moved inwardly toward the contact wheel 29, and the switch arm 19 to be moved away from the wheel 29. The movement of the switch arms is of greater rapidity than the movement of the wheel 29, and in their movement describe an arm of a circle so centered that in their movement along this arc and at the increased rate of speed, would compensate for the movement of contact wheel 29 by raising the brush 34 so as to engage contact 33 at the same relative point that brush 35 had formed its contact, thus insuring the indication of the reversal, should the reversal occur when in contact. In this instance, the current would be transmitted through the wires 41 and 42.

From the foregoing, it will be seen that a switch can be easily operated for making contact for the rising water, and can be quickly reversed upon the receding of the water as the float lowers, and if the water is receding and should begin to rise, the switch would again be reversed and cause the other contact brush to be brought into engagement with the contact points of the disk 29 for affording means for indicating the rising of the water.

Having fully described our invention, what we claim as new and desire to secure by Letters Patent, is:—

1. In an electric switch, the combination with a shaft, of a contact wheel mounted thereon, switch arms, means for causing the arms to be actuated, and means for operating the shaft for causing the operation of the arms and wheel, whereby one arm will be moved to engage the wheel as the shaft rotates in one direction, and the other arm will be moved to engage the wheel upon the rotation of the shaft in the opposite direction.

2. In an electric switch, the combination with a shaft, of a float for controlling the movement of the shaft, a contact wheel mounted upon the shaft, switch arms, and means on the shaft for actuating the arms, causing one of them to be moved to engage the contact wheel upon the rotation of the shaft.

3. In an electric switch, the combination with a shaft, means for controlling the movement of the shaft, of a contact wheel mounted upon the shaft, switch arms, and an arm frictionally mounted upon the shaft in engagement with the switch arms for causing one of the arms to be moved to engage the contact wheel upon the rotation of the shaft in one direction, and the other arm to be moved to engage the contact wheel upon the rotation of the shaft in a reverse direction.

4. In an electric switch, the combination with a shaft, means for controlling the movement of the shaft, of an insulated contact wheel mounted upon the shaft, a brush in engagement with the wheel for transmitting an electric current thereto and acting as a brake, switch arms, and means on the shaft for actuating the switch arms for causing one of the arms to be moved to engage the contact wheel upon the movement of the shaft.

5. In an electric switch, the combination with a shaft, of a wheel loosely mounted on the shaft, means on the shaft engaging the wheel for allowing the wheel a partial rotation upon the shaft, a float for controlling the movement of the wheel for transmitting movement to the shaft, a contact wheel mounted upon the shaft, a switch arm, and means on the shaft for operating the switch arm, whereby it is caused to be moved to engage the contact wheel upon the movement of the shaft.

6. In an electric switch, the combination with a frame having a shaft, means for controlling the movement of the shaft, of a contact wheel, switch arms pivotally mounted on the frame, and means on the shaft engaging the switch arms for causing one of the arms to be moved to engage the contact wheel upon the rotation of the shaft in one direction, and the other arm to be moved to engage the contact wheel upon the rotation of the shaft in a reverse direction.

7. In an electric switch, the combination with a frame having a shaft thereon, of a float for controlling the movement of the shaft, a contact wheel, switch arms pivotally mounted on the frame, a plate pivotally mounted on the frame in engagement with the switch arms, and means on the shaft in engagement with the plate for causing the operation of the switch arms upon the movement of the shaft, whereby one of the switch arms will be moved to engage the contact wheel upon the rotation of the shaft.

8. In an electric switch, the combination with a frame having a shaft thereon, of a contact wheel mounted upon the shaft, means for controlling the direction of rotation of the wheel, of switch arms having brushes, one of which brushes is adapted to be in position to be engaged by the wheel, and means for operating the arms, whereby upon the reverse movement of the wheel they will be moved causing the other brush to be brought into position to be engaged by the wheel, at the same relative point from which the first-named brush has been withdrawn, thereby compensating for the movement of the contact wheel.

9. In an electric switch, the combination with a frame having a shaft thereon, of a contact wheel mounted upon the shaft having wedge-shaped contact points, means for controlling the direction of rotation of the wheel, of switch arms having brushes, one of which brushes is adapted to be in position to be engaged by the contact points of the wheel, and means for operating the arms, whereby upon the reverse movement of the wheel they will be moved, causing the other brush to be brought into position to be engaged by the contact points of the wheel at the same relative point from which the first-named brush has been withdrawn, thereby compensating for the movement of the contact wheel.

10. In an electric switch, the combination with a frame having a shaft thereon, of a contact wheel mounted upon the shaft having wedge-shaped contact points, means for controlling the direction of movement of the wheel, switch arms having brushes thereon, said brushes adapted to engage the contact points, and the contact surface of the contact points being at the same angle for engagement by the brushes when the wheel is moved in any direction, and means for actuating the arms whereby one brush will always be in position to be engaged by the contact points.

In testimony whereof we affix our signatures, in the presence of two witnesses.

ERNEST K. MACKINTOSH.
EZEKIEL A. SMITH.

Witnesses:
C. A. NEALE,
WATTS T. ESTABROOK.

Correction in Letters Patent No. 973,362.

It is hereby certified that in Letters Patent No. 973,362, granted October 18, 1910, upon the application of Ernest K. Mackintosh and Ezekiel A. Smith, of Washington, District of Columbia, for an improvement in "Electric Switches," an error appears in the printed specification requiring correction as follows: Page 2, line 105, the word "arm" should read *arc;* and that the said Letters Patent should be read with this correction therein that the same may conform to the record of the case in the Patent Office.

Signed and sealed this 7th day of February, A. D., 1911.

[SEAL.]

C. C. BILLINGS,

*Acting Commissioner of Patents.*